(12) United States Patent
Ito (10) Patent No.: US 8,926,018 B2
(45) Date of Patent: Jan. 6, 2015

(54) RECLINING APPARATUS

(75) Inventor: Koji Ito, Kanagawa (JP)

(73) Assignee: Shiroki Corporation, Kanagawa (JP)

( * ) Notice: Subject to any disclaimer, the term of this patent is extended or adjusted under 35 U.S.C. 154(b) by 50 days.

(21) Appl. No.: 13/819,804

(22) PCT Filed: May 30, 2011

(86) PCT No.: PCT/JP2011/062341
§ 371 (c)(1),
(2), (4) Date: Feb. 28, 2013

(87) PCT Pub. No.: WO2012/029369
PCT Pub. Date: Mar. 8, 2012

(65) Prior Publication Data
US 2013/0154331 A1    Jun. 20, 2013

(30) Foreign Application Priority Data

Sep. 1, 2010    (JP) .................................. 2010-195816

(51) Int. Cl.
*B60N 2/235*    (2006.01)
*B60N 2/48*    (2006.01)
*A47C 1/025*    (2006.01)

(52) U.S. Cl.
CPC .............. *A47C 1/025* (2013.01); *B60N 2/2356* (2013.01)
USPC ..................................... 297/367 P; 297/366

(58) Field of Classification Search
USPC ............................................... 297/366, 367 P
See application file for complete search history.

(56) References Cited

U.S. PATENT DOCUMENTS

| 5,590,931 | A * | 1/1997 | Fourrey et al. ................. 297/366 |
| 6,820,937 | B1 * | 11/2004 | Esaki et al. .................... 297/366 |
| 7,828,385 | B2 * | 11/2010 | Reubeuze ....................... 297/366 |
| 2009/0250990 | A1 | 10/2009 | Endo et al. |
| 2011/0254338 | A1 * | 10/2011 | Fisher et al. ............... 297/367 P |

FOREIGN PATENT DOCUMENTS

| CN | 101048091 A | 10/2007 |
| JP | 2007-85521 | 4/2007 |
| JP | 2008-212455 | 9/2008 |
| JP | 2010-23566 | 2/2010 |

* cited by examiner

*Primary Examiner* — Sarah B McPartlin
(74) *Attorney, Agent, or Firm* — Cheng Law Group, PLLC (57) ABSTRACT

A reclining apparatus in which assembly of a rotation cam to be arranged on the side of a center axis with respect to a pole and configured to move to a locked position in which outer teeth of the pole engages inner teeth of a ratchet (first member) is disclosed. A rotation cam 31 is formed with a through hole 31*a* having a center at a center of rotation thereof, and a spacer 75 provided on a bottom portion of a ratchet (first member) 21 and configured to restrict the pole 33 from moving to the bottom portion of the ratchet 21 is formed with a cylindrical portion 77 configured to fit to the through hole 31*a* of the rotation cam 31.

5 Claims, 6 Drawing Sheets

PRIOR ART

RECLINING APPARATUS

TECHNICAL FIELD

The present invention relates to a reclining apparatus including: a bottomed cylindrical first member formed with inner teeth on an inner cylindrical surface along the circumferential direction and having an opened surface on one of the surfaces; a second member stacked on the side of the opened surface of the first member and provided so as to be capable of rotating relative to the first member in the circumferential direction; a pawl provided on the second member so as to be capable of moving and formed with outer teeth capable of engaging the inner teeth; a rotation cam arranged on the side of a center axis of the relative rotation with respect to the pawl, engaging the pawl, and configured to move the pawl to a locked position where the outer teeth of the pawl engage the inner teeth of the first member; an urging member configured to urge the rotation cam so as to position the pawl at the locked position; an unlock retaining mechanism including a curved guide extending along the circumferential direction formed on the first member on the inner cylindrical surface on the side of a bottom portion with respect to the inner teeth thereof and an abutting portion configured to retain the pawl in an unlocked position when abutting against the curved guide; and a spacer provided on the bottom portion of the first member and configured to restrict the pawl from moving to the bottom portion of the first member.

BACKGROUND ART

Figure 7:
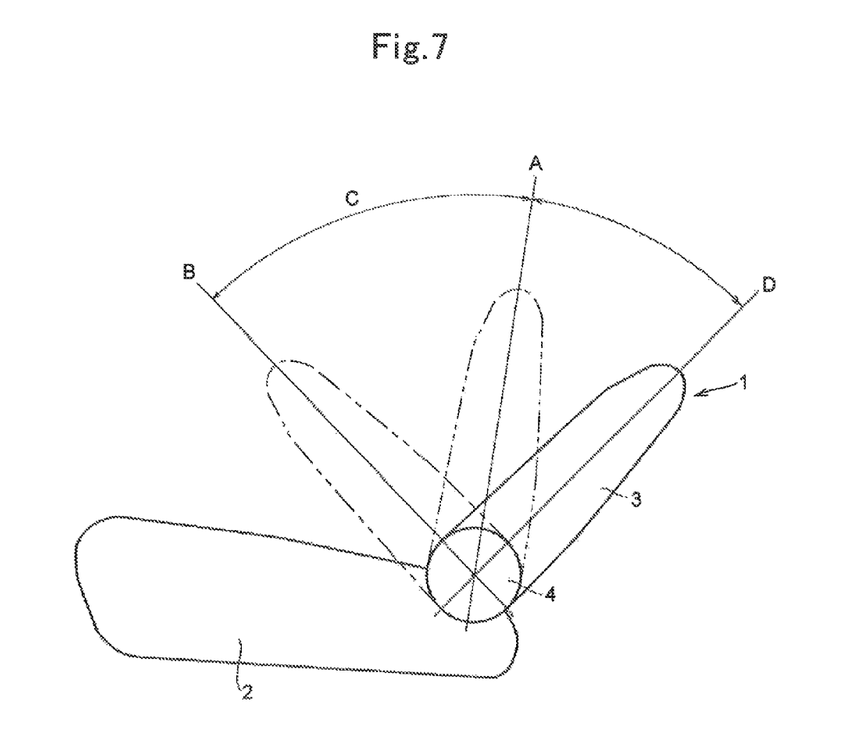
FIG. 7 is a configuration drawing illustrating a seat.
Figure 8:
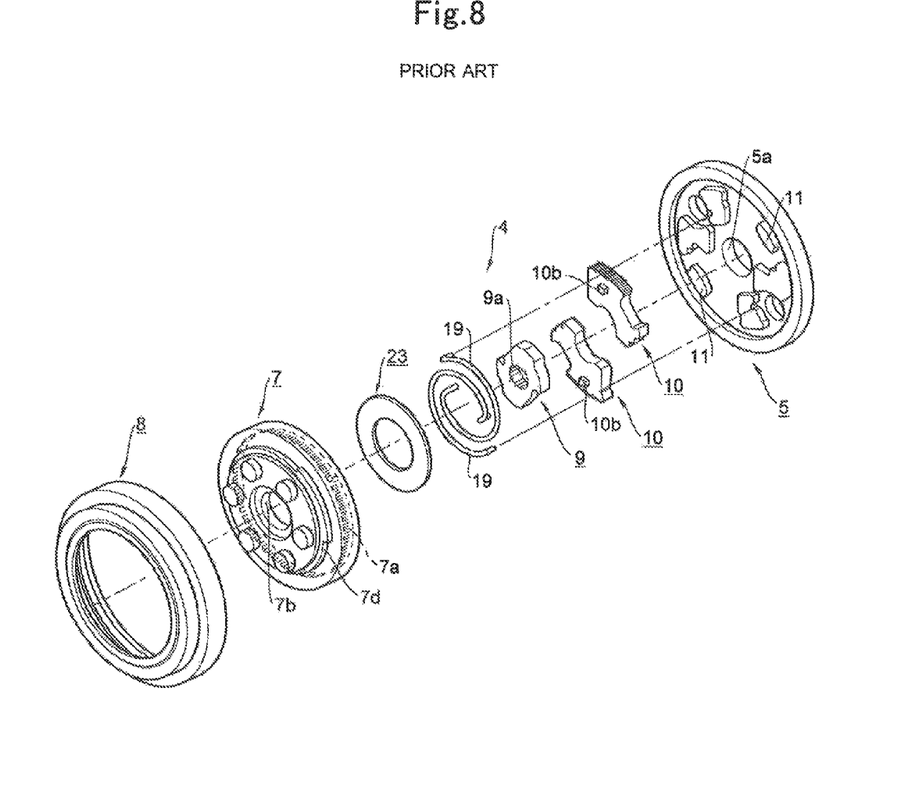
FIG. 8 is an exploded perspective view illustrating a seat reclining apparatus for a vehicle of the related art.

Description will be given with reference to FIG. 7 and FIG. 8. FIG. 7 is a configuration drawing of a seat, and FIG. 8 is an exploded perspective view of a seat reclining apparatus for a vehicle of the related art.

As illustrated in FIG. 7, a seat 1 includes a seat cushion 2 configured to support buttocks of a seated person, and a seatback 3 provided so as to be tiltable in the fore-and-aft direction with respect to the seat cushion 2 and configured to support a back of the seated person. Reference numeral 4 denotes a reclining apparatus provided on an axis of rotation of the tilting movement of the seatback 3 and configured to allow/restrict the tilting movement of the seatback 3.

Subsequently, the reclining apparatus 4 will be described with reference to FIG. 8. In the drawing, the reclining apparatus 4 includes a ratchet (first member) 7 formed with inner teeth 7a extending along the circumferential direction of the circle and having an opened surface on one of the surfaces and a base plate (second member) 5 stacked on the ratchet 7 on the side of the opened surface and provided so as to be capable of rotating relative to the ratchet 7 in the circumferential direction.

The base plate 5 includes two pawls 10 each having outer teeth 10d capable of engaging the inner teeth 7a provided thereon so as to be capable of performing a rotational movement about a shaft portion 11 formed on the base plate 5.

Then, the respective pawls 10 are moved to a locked position where the outer tooth 10d engage the inner tooth 7a and an unlocked position where the engagement between the outer teeth 10d and the inner teeth 7a is released by a rotation cam 9. Furthermore, the respective pawls 10 are urged in the locked direction via the rotation cam 9 by a spring (urging member) 19 locked at one end thereof to the base plate 5 and the other end portion thereof to the rotation cams 9.

The rotation cam 9 is formed with a through hole 9a having serration on an inner wall surface at the center of rotation thereof. Then, the rotation cam 9 is operated from the outside of the reclining apparatus 4 by an operating shaft, not illustrated, penetrating through through holes 7b, 5a formed at centers of the base plate 5 and the ratchet 7, and fitted to the through hole 9a of the rotation cam 9.

The reclining apparatus 4 is provided with an unlock retaining mechanism including a curved guide 7d extending along the circumferential direction formed on the ratchet 7 on an inner cylindrical surface on the side of a bottom portion with respect to the inner teeth 7a thereof and projections 10b formed on the respective pawls 10 and configured to retain the pawls 10 in the unlocked position when abutting against the curved guide 7d.

An annular spacer 23 configured to restrict the pawls 10 from moving to the bottom portion of the ratchet 7 is arranged on the bottom portion of the ratchet 7. The spacer 23 is press-fitted onto an outer peripheral surface of a cylindrical upright wall portion 7b formed on an inner wall surface of the ratchet 7 so as to project in the direction toward the base plate 5 along the peripheral edge of the inner tooth 7a. The upright wall portion 7b is formed by burring.

An outer peripheral portion of the ratchet 7 and an outer peripheral portion of the base plate 5 are held by a ring-shaped outer peripheral ring 8 and are integrated.

An operation of the reclining apparatus will be described. It is assumed that the ratchet 7 is provided on the seatback side, and the base plate 5 is provided on the seat cushion side.

Generally, the respective pawls 10 provided on the base plate 5 are in the locked position where the outer teeth 10d engage the inner teeth 7a of the ratchet 7 by an urging force of the spring 19, and hence a relative rotation between the ratchet 7 and the base plate 5 is restricted, and the seatback 3 is in the state of incapable of rotating with respect to the seat cushion 2 (a locked state).

When the operating shaft, not illustrated, is operated and the rotation cam 9 is rotated against the urging force of the spring 19, the respective pawls 10 move to the unlocked position where the engagement between the outer teeth 10d and the inner teeth 7a is released, and allows the relative rotation between the ratchet 7 and the base plate 5, so that the seatback 3 is allowed to rotate with respect to the seat cushion 2.

When an operating force to the rotation cam 9 is released, the outer teeth 10d of the respective pawls 10 provided on the base plate 5 engage the inner teeth 7a of the ratchet 7 by the urging force of the spring 19 and the relative rotation between the ratchet 7 and the base plate 5 is restricted, so that the locked state is achieved again.

As illustrated in FIG. 7, between a first level locked state A and a reclined state D, when the operating shaft, not illustrated, is operated and the rotation cam 9 is rotated to unlock and the operating force to the operating shaft is released, the pawls 10 are restored to the locked position by the urging force of the spring 19, so that the locked state is achieved.

In contrast, in a section between the first level locked state A and a forward folded state B (an unlock retaining state C), even when the operating force to the operating shaft is released by the above-described unlock retaining mechanism, the pawls 10 are retained in the unlocked position, so that the seatback 3 can be rotated without operating the operating shaft.

CITATION LIST

Patent Literature

PL1: JP-A-2010-23566

DISCLOSURE OF INVENTION

Technical Problem

However, assembly of the reclining apparatus illustrated in FIG. 8 is achieved by stacking the ratchet 7 including the spacer 23 press-fitted onto the upright wall portion 7b formed by burring on the base plate 5 having the two pawls 10, the rotation cam 9, and two of the springs 19 set therein, and integrating the same by using the outer peripheral ring 8.

Therefore, a step of forming the upright wall portion 7b on the ratchet 7 by burring and a step of press-fitting the spacer 23 onto the upright wall portion 7b of the ratchet 7 are required, and hence there is a problem that the assembly is troublesome.

In view of such problem described above, it is an object of the present invention to provide an easy-to-assemble reclining apparatus.

Solution to Problem

The invention according to Claim 1 is a reclining apparatus including: a bottomed cylindrical first member formed with inner teeth on an inner cylindrical surface along the circumferential direction and having an opened surface on one of the surfaces; a second member stacked on the side of the opened surface of the first member and provided so as to be capable of rotating relative to the first member in the circumferential direction; a pawl provided on the second member so as to be capable of moving and formed with outer teeth capable of engaging the inner teeth; a rotation cam arranged on the side of a center axis of the relative rotation with respect to the pawl and configured to move the pawl to a locked position where the outer teeth of the pawl engage the inner teeth of the first member; an urging member configured to urge the rotation cam so as to position the pawl at the locked position; an unlock retaining mechanism including a curved guide extending along the circumferential direction formed on the first member on the inner cylindrical surface on the side of the bottom portion with respect to the inner teeth thereof and an abutting portion configured to retain the pawl in an unlocked position when abutting against the curved guide; a spacer provided on the bottom portion of the first member and configured to restrict the pawl from moving to the bottom portion of the first member, wherein the rotation cam is formed with a through hole having a center at a center of rotation thereof, and the spacer is formed with a cylindrical portion to be fitted in the through hole of the rotation cam.

The invention according to Claim 2 is the reclining apparatus according to Claim 1, wherein fitting between the cylindrical portion of the spacer and the through hole of the rotation cam is fitting by which the rotation of the spacer is transmitted to the rotation cam, and the urging member is a spring locked at one end portion thereof to the cylindrical portion of the spacer and at the other end portion thereof to the second member.

The invention according to Claim 3 is the reclining apparatus according to Claim 2, wherein an operating shaft is fitted to the cylindrical portion of the spacer.

Advantageous Effects of Invention

According to the invention of Claim 1 to Claim 3, the formation of the through hole having the center at the center of rotation thereof in the rotation cam and the cylindrical portion to be fitted to the through hole of the rotation cam on the spacer eliminates the necessity of a process of press-fitting the spacer to the ratchet, and hence the assembly is simplified.

According to the invention of Claim 2, the fitting between the cylindrical portion of the spacer and the through hole of the rotation cam is the fitting whereby the rotation of the spacer is transmitted to the rotation cam, and the urging member is the spring locked to the cylindrical portion of the spacer at one end portion thereof and locked to the second member at the other end portion thereof. Therefore, only one spring is necessary, and hence the assembly is simplified.

In addition, by increasing the height of the cylindrical portion so as to be exposed to the outside from the second member, the spring may be laid out outside the reclining apparatus.

DESCRIPTION OF THE PREFERRED EMBODIMENTS

Figure 1:
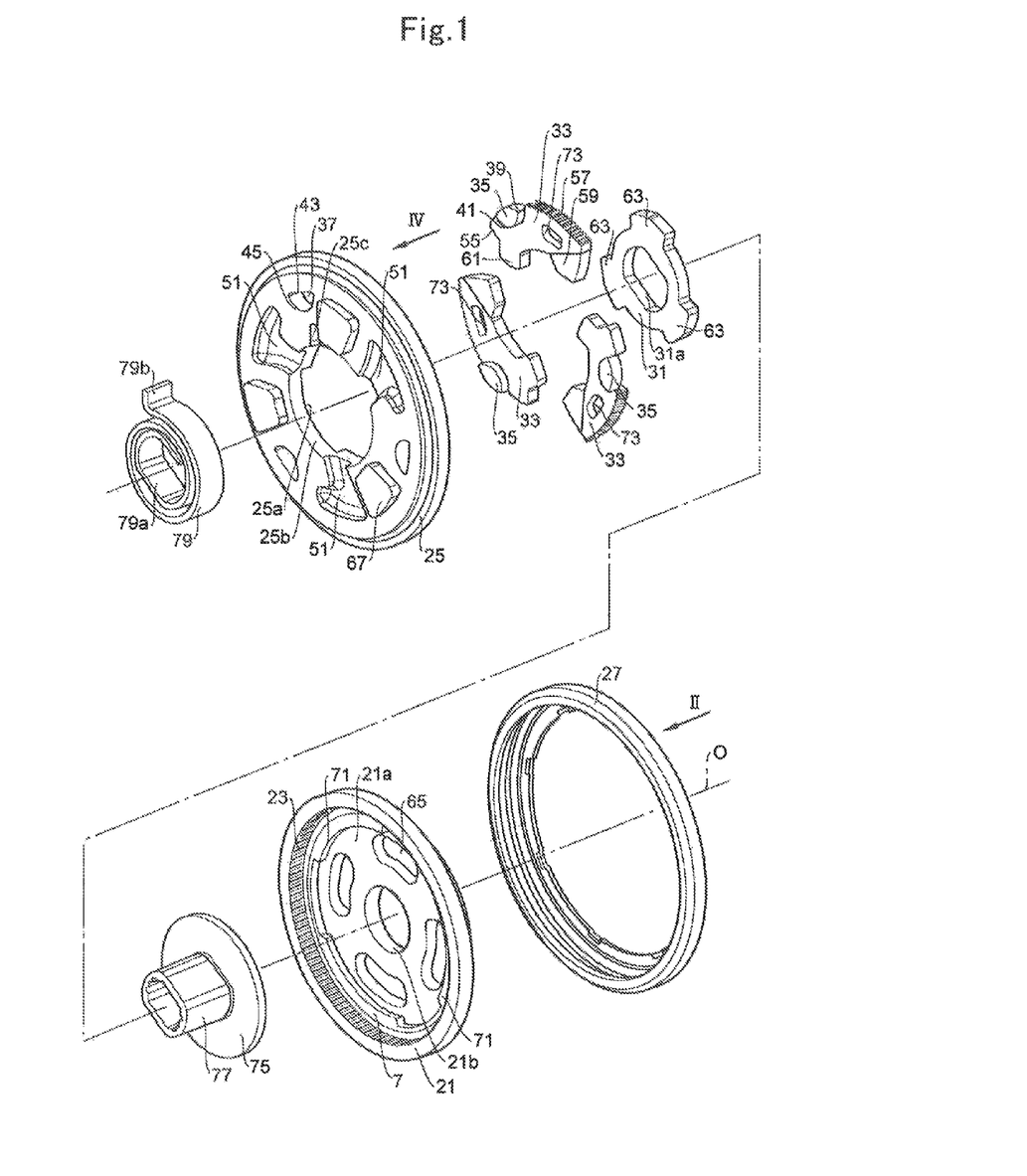
FIG. 1 is an exploded perspective view illustrating a reclining apparatus of an embodiment.
Figure 2:
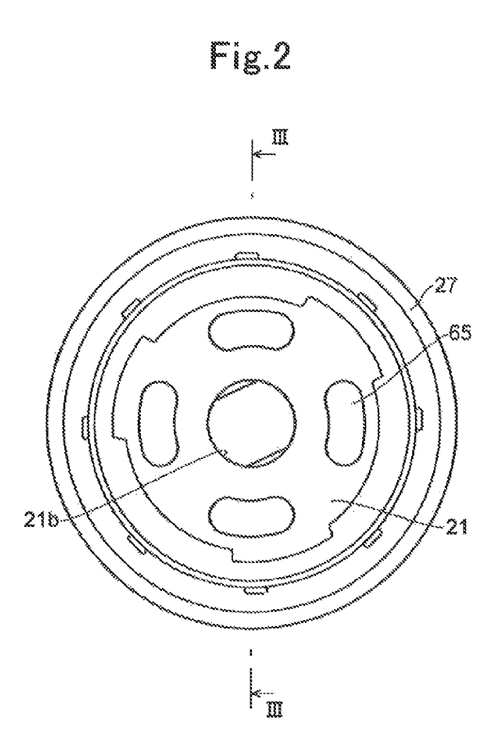
FIG. 2 is a perspective view illustrating a ratchet of FIG. 1 viewed from an arrow II.
Figure 3:
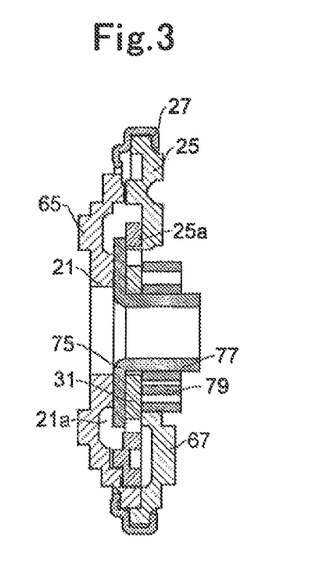
FIG. 3 is a cross-sectional view taken along a section line III-III in FIG. 2.
Figure 4:
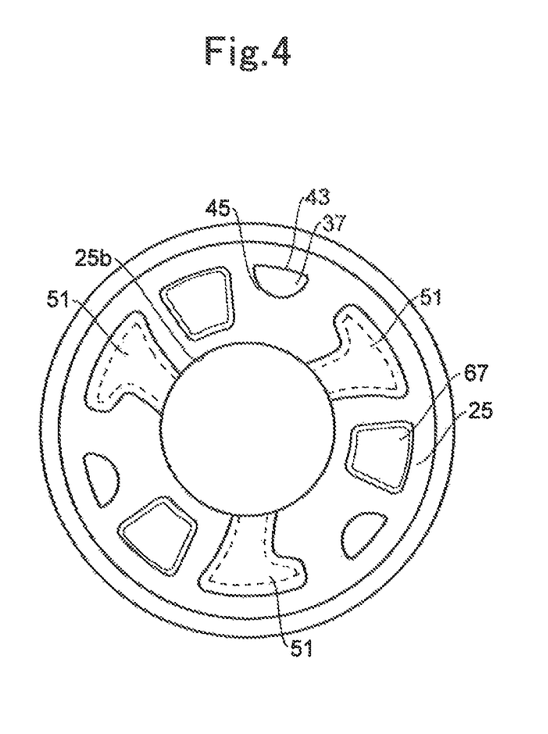
FIG. 4 is a drawing illustrating a base plate of FIG. 1 viewed in the direction of an arrow IV.
Figure 5:
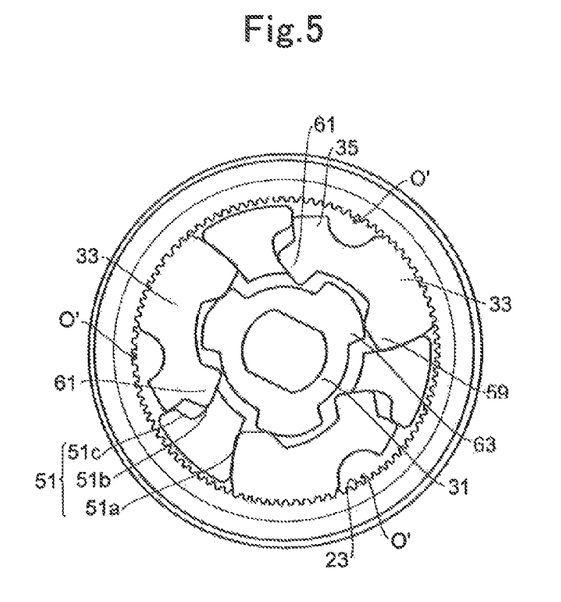
FIG. 5 is an explanatory drawing illustrating a locked state of a locking apparatus of the embodiment.
Figure 6:
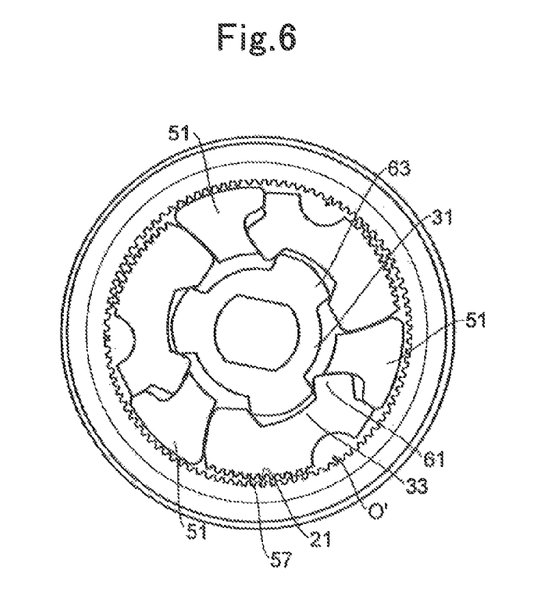
FIG. 6 is an explanatory drawing illustrating an unlocked state of the locking apparatus of the embodiment.

Referring now to the drawings, an embodiment of the present invention will be described. FIG. 1 is an exploded perspective view illustrating a reclining apparatus of the embodiment, FIG. 2 is a drawing viewed in the direction of an arrow II in FIG. 1, FIG. 3 is a cross-sectional view taken along a section line III-III in FIG. 2, FIG. 4 is a drawing illustrating a base plate of FIG. 1 viewed in the direction of an arrow IV, FIG. 5 is an explanatory drawing illustrating a locked state of a locking apparatus of the embodiment, and FIG. 6 is an explanatory drawing illustrating an unlocked state of the locking apparatus of the embodiment.

The reclining apparatus of an example of the embodiment is provided on an axis of rotation of a tilting movement of a seatback 3 in the same manner as a reclining apparatus 4 in FIG. 7.

In FIG. 1, a ratchet (first member) 21 provided on the side of the seatback has a bottomed cylindrical shape having an opened surface on one of the surfaces formed by half punching (half blanking: a processing for forming a projecting shape by stopping the punching operation in mid-course) a disk-shaped plate material. An inner cylindrical surface of the ratchet 21 is formed with inner teeth 23 along the entire circumferential area. A center of a bottom portion 21a is formed with a through hole 21b.

A base plate (second member) 25 provided on the side of the seat cushion has a bottomed cylindrical shape having an opened surface on one of the surfaces formed by half punching a disk-shaped plate material. The diameter of a bottom portion 25a of the bottomed cylinder is set to be slightly larger than the outer diameter of the ratchet 21. Then, the ratchet 21 is fitted to the bottom portion 25a and the base plate 25 and the ratchet 21 are capable of rotating relative to each other. The ratchet 21 is formed with a though hole 25b at a center of the ratchet 21.

As illustrated in FIG. 3, an outer peripheral portion of the ratchet 21 and an outer peripheral portion of the base plate 25 are held by a ring-shaped outer peripheral ring 27, and the ratchet 21 and the base plate 25 are not separated in the direction of an axis of a relative rotation (O in FIG. 1) and are retained so as to be capable of rotating relative to each other.

Returning back to FIG. 1, a rotation cam 31 is arranged in a space formed by the bottom portion 21a of the ratchet 21 and the bottom portion 25a of the base plate 25. A non-circular (oval-shaped) through hole 31a is formed at a center of the rotation cam 31.

Three pawls 33 are arranged around the rotation cam 31.

A projecting portion 35 is formed in the vicinity of the surface facing the inner teeth 23 of the pawl 33 on the surface facing the bottom portion 25a of the base plate 25 of the pawl 33 through a half punching process. In the embodiment, the cross-sectional shape of the projecting portion 35 of the pawl 33 is a substantially half-moon shape including a first arc 39 on the side of the inner teeth 23 and a second arc 41 having a diameter smaller than the diameter of the first arc 39 as illustrated in FIG. 1.

In contrast, the base plate 25 is formed with holes (depressions) 37 allowing rotatable engagement of the projecting portions 35 of the pawls 33 and penetrating through the base plate 25. The cross-sectional shape of the hole 37 is substantially a half-moon shape including a third arc 43 on the side of the inner teeth 23 and a fourth arc 45 having a diameter smaller than that of the third arc 43, having the same diameter as that of the second arc 41 of the projecting portion 35 of the pawl 33, and having an arc length longer than the fourth arc 45.

Therefore, the center axis of rotation of each of the pawls 33 is an axis passing through the center of the second arc 41 of the projecting portions 35 and the fourth arc 45 of the hole 37 and extending parallel to the center axis O of inner teeth. In this example of embodiment, as illustrated in FIGS. 5 and 6, center axes of rotation (O') of the pawls 33 are set to be located in the vicinity of the inner teeth 23. The holes 37 may be through holes, and may be bottomed holes.

A surface of each of the pawls 33 facing the inner teeth 23 is formed with outer teeth 57 engageable with the inner teeth 23 on one side with the projecting portion 35 interposed therebetween, and an inner teeth facing portion 55 capable of abutting against the inner teeth 23 on the other side, respectively. In addition, a back surface of each of the pawls 33 (a surface opposite to the surface facing the inner teeth 23) is formed with a locking portion 59 facing the outer teeth 57 and an unlocking portion 61 facing the inner teeth facing portion 55. In addition, the pawls 33 of the embodiment are quenched entirely.

The rotation cam 31 is formed with a cam portion 63 extending in the radial direction and capable of coming into press contact with the locking portion 59 and the unlocking portion 61 of each of the pawls 33.

The base plate 25 is formed with guides 51 projecting in the direction toward the ratchet 21 and configured to rotatably guide the pawls 33 on a surface thereof facing the ratchet 21 through a half punching process.

The guides 51 each include a first guide portion 51a configured to guide a side surface of the pawl 33 on the side of the outer teeth 57, a second guide portion 51b guiding the side surface of the pawl 33 on the side of the inner teeth facing portion 55, and a stopper portion 51c provided continuously from the second guide portion 51b and capable of allowing abutment of the unlocking portion 61 of the pawl 33 as illustrated in FIGS. 5 and 6.

As illustrated in FIG. 1 and FIG. 2, projecting portions 65 for mounting the reclining apparatus to a flame on the seatback side are formed on a surface of the ratchet 21 exposed to the outside (a surface of the ratchet 21 on the side opposite to a surface facing the base plate 25) through a half punching process. Projecting portions 67 for mounting the reclining apparatus to a frame on the seat cushion side are formed on a surface exposed to the outside of the base plate 25 (a surface of the base plate 25 opposite to the surface facing the ratchet 21) through a half punching process.

In this example of embodiment, an unlock retaining mechanism including three curved guides 71 extending along the circumferential direction formed on the ratchet 21 on the inner cylindrical surface on the side of the bottom portion with respect to the inner teeth 23 thereof and projecting portions (abutting portions) 73 formed on the respective pawls 33 on surfaces facing the bottom portion 21a of the ratchet 21 through a half punching process is provided.

In this configuration, when the projecting portions 73 of the respective pawls 33 abut against the curved guides 71, the pawls 33 are retained in the unlocked position.

A disk-shaped spacer 75 configured to restrict the pawls 33 from moving to the bottom portion 21a of the ratchet 21 is arranged on the bottom portion of the ratchet 21. The spacer 75 is formed with a cylindrical portion 77 having a cross section of non-circular (oval-shaped) shape and configured to fit to the through hole 31a of the rotation cam 31. This fitting is the fitting which causes the rotation of the spacer 75 to be transmitted to the rotation cam 31. In addition, the cylindrical portion 77 is set to have a height exposing to the outside from the through hole 25b of the base plate 25.

A spiral spring 79 formed by processing an elongated leaf spring material as an urging member into a spiral shape is arranged in the through hole 25b of the base plate 25. An inner end portion 79a of the spiral spring 79 is locked by being wound on the cylindrical portion 77 of the spacer 75, and an outer end portion thereof is locked on a notched portion 25c formed on a peripheral surface of the through hole 25b of the base plate 25. Therefore, the pawls 33 are urged toward the locked position by an urging force of the spiral spring 79 via the rotation cam 31.

In addition, the operating shaft having a non-circular shape (oval shape) in cross section is fitted to the cylindrical portion 77 of the spacer 75.

Here, referring to FIG. 5 and FIG. 6, an operation of the reclining apparatus of the embodiment will be described.

As illustrated in FIG. 5, when an operating force is not applied to the rotation cam 31, the cam portions 63 of the rotation cam 31 push the locking portions 59 of the respective pawls 33 by an urging force of the urging member. Therefore, the respective pawls 33 are in the locked position where the outer teeth 57 engages the inner teeth 23 of the ratchet 21, and hence the relative rotation between the ratchet 21 and the base plate 25 is restricted, and the seatback is in the state of incapable of rotating with respect to the seat cushion (the locked state).

When the cam 33 is rotated by operating the operating shaft, not illustrated, against the urging force of the spiral spring 79, the cam portions 63 push the unlocking portions 61 of the respective pawls 33. Then, as illustrated in FIG. 6, the respective pawls 33 move to the unlocked position where the engagement between the outer teeth 57 and the inner teeth 23 of the ratchet 21 is released, and hence the relative rotation between the ratchet 21 and the base plate 25 is allowed, and the seatback is allowed to rotate with respect to the seat cushion. The operation of the operation shaft, not illustrated, is allowed until the unlocking portions 61 of the pawls 33 abut against the stopper portions 51c of the guides 51.

When the operating force to the operating shaft is released, as illustrated in FIG. 5, the pawls 33 are restored to the locked position in which the outer teeth 57 engage the inner teeth 23 of the ratchet 21 by the urging force of the spiral spring 79 and the relative rotation between the ratchet 21 and the base plate 25 is restricted, so that the locked state is achieved again.

In contrast, between a first level locked state A and a forward folded state B illustrated in FIG. 7 (an unlock retaining state C), even when the operating force to the operating shaft is released by the above-described unlock retaining mechanism, the pawls 33 are retained in the unlocked position, so that the seatback can be rotated without operating the operating shaft.

In this configuration of the reclining apparatus as described above, the following effects are achieved.

(1) The formation of the through hole 31a having the center at the center of rotation in the rotation cam 31 and the cylindrical portion 77 to be fitted to the through hole 31a of the rotation cam 31 on the spacer 75 eliminates the necessity of the process of forming the upright wall portion by burring as illustrated in FIG. 8 and the process of press-fitting the spacer to the upright wall portion, and hence the assembly is simplified.

(2) The fitting between the cylindrical portion 77 of the spacer 75 and the through hole 31a of the rotation cam 31 is the fitting whereby the rotation of the spacer 75 is transmitted to the rotation cam 31, and the urging member is the spiral spring 79 locked to the cylindrical portion 77 of the spacer 75 at one end thereof and locked to the base plate 25 at the other end thereof. Therefore, only one spring is necessary, and hence the assembly is simplified.

(3) The setting of the cylindrical portion 77 to a level exposed to the outside from the through hole 25b of the base plate 25 allows the spiral spring 79 to be laid out outside the reclining apparatus.

The present invention is not limited to the embodiment described above. The ratchet 21 is provided on the seatback side and the base plate 25 is provided on the seat cushion side in the embodiment described above. In contrast, however, it is also possible to provide the base plate 25 on the seatback side and the ratchet 21 on the seat cushion side.

REFERENCE NUMERALS 21 ratchet
25 base plate
31 rotation cam
31a hole
75 spacer
77 cylindrical portion

The invention claimed is:

1. A reclining apparatus comprising:
a bottomed cylindrical first member formed with inner teeth on an inner cylindrical surface along the circumferential direction and having an opened surface on one of the surfaces;
a second member stacked on the side of the opened surface of the first member and provided so as to be capable of rotating relative to the first member in the circumferential direction;
a pawl provided on the second member so as to be capable of moving and formed with outer teeth capable of engaging the inner teeth;
a rotation cam arranged on the side of a center axis of the relative rotation with respect to the pawl and configured to move the pawl to a locked position where the outer teeth of the pawl engage the inner teeth of the first member;
an urging member configured to urge the rotation cam so as to position the pawl at the locked position;
an unlock retaining mechanism including an curved guide extending along the circumferential direction formed on the first member on the inner cylindrical surface on the side of a bottom portion with respect to the inner teeth thereof and an abutting portion provided on the pawl and configured to retain the pawl in an unlocked position when abutting against the curved guide;
a spacer provided on the bottom portion of the first member and configured to restrict the pawl from moving to the bottom portion of the first member, wherein
the rotation cam is formed with a through hole having a center at a center of rotation thereof, and
the spacer is formed with a cylindrical portion to be fitted in the through hole of the rotation cam, and an outer diameter of the cylindrical portion is smaller than an outer diameter of the spacer.

2. The reclining apparatus according to claim 1, wherein fitting between the cylindrical portion of the spacer and the through hole of the rotation cam is fitting by which the rotation of the spacer is transmitted to the rotation cam, and
the urging member is a spring locked at one end portion thereof to the cylindrical portion of the spacer and at the other end portion thereof to the second member.

3. The reclining apparatus according to claim 2, wherein an operating shaft is fitted to the cylindrical portion of the spacer.

4. The reclining apparatus according to claim 1, wherein the spacer is disk-shaped.

5. The reclining apparatus according to claim 1, wherein a height of the cylindrical portion is such that it extends past the second member to be exposed to the outside.

* * * * *